US009013505B1

(12) United States Patent
Thornton

(10) Patent No.: US 9,013,505 B1
(45) Date of Patent: Apr. 21, 2015

(54) MOBILE SYSTEM REPRESENTING VIRTUAL OBJECTS ON LIVE CAMERA IMAGE

(75) Inventor: Seth A. Thornton, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 2193 days.

(21) Appl. No.: 11/986,840

(22) Filed: Nov. 27, 2007

(51) Int. Cl.
 *G09G 5/00* (2006.01)
 *G09G 5/36* (2006.01)

(52) U.S. Cl.
 CPC .................................... *G09G 5/36* (2013.01)

(58) Field of Classification Search
 USPC ................. 45/419, 632, 633, 156; 455/556.1, 455/556.2; 345/419, 632, 633, 156; 463/42
 See application file for complete search history.

(56) References Cited

U.S. PATENT DOCUMENTS

| | | | |
|---|---|---|---|
| 6,307,556 B1 | 10/2001 | Ellenby et al. | |
| 6,917,370 B2 * | 7/2005 | Benton | 345/633 |
| 7,088,389 B2 | 8/2006 | Shibasaki et al. | |
| 7,245,273 B2 | 7/2007 | Eberl et al. | |
| 2005/0035980 A1 * | 2/2005 | Lonsing | 345/633 |
| 2007/0273644 A1 * | 11/2007 | Mondine Natucci | 345/156 |
| 2009/0051682 A1 * | 2/2009 | Lonsing | 345/419 |
| 2010/0185529 A1 * | 7/2010 | Chesnut et al. | 345/633 |
| 2010/0208057 A1 * | 8/2010 | Meier et al. | 455/556.1 |

* cited by examiner

*Primary Examiner* — Chante Harrison

(57) ABSTRACT

A mobile data service is delivered to a mobile device having a camera for capturing a live scene, a GPS receiver for determining geographic coordinates of the mobile device, and a display for displaying the live scene. A wireless network exchanges data signals with the mobile device. A server stores a database of virtual objects defined within a geographic space. The server receives the geographic coordinates of the mobile device. The server identifies one or more virtual objects within a field of view in the geographic space determined in response to the geographic coordinates of the mobile device. The server transmits representation image data to the mobile device corresponding to the one or more virtual objects as would be seen according to the field of view. The mobile device generates a representation on the display in response to the representation image data.

20 Claims, 5 Drawing Sheets

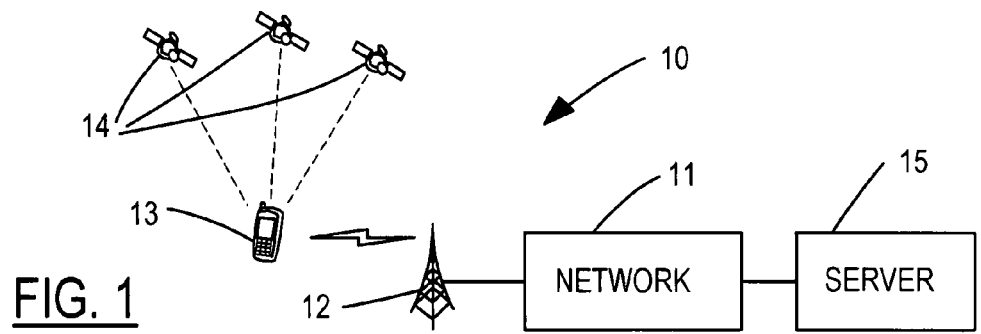
FIG. 1
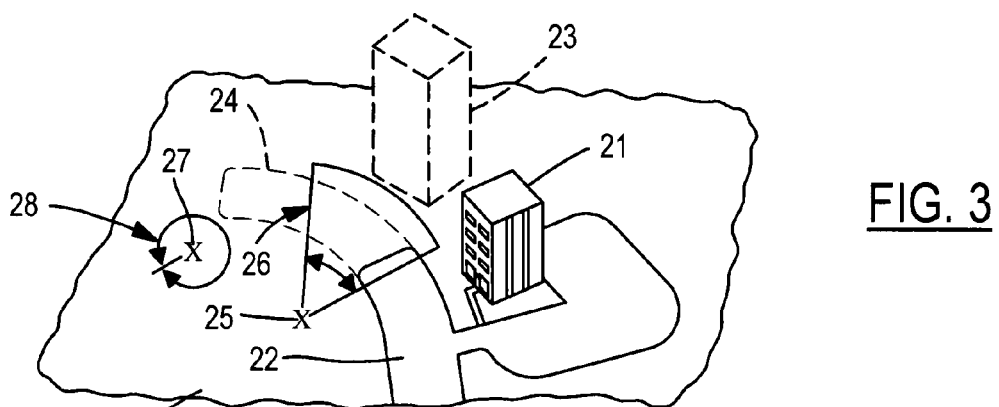
FIG. 3
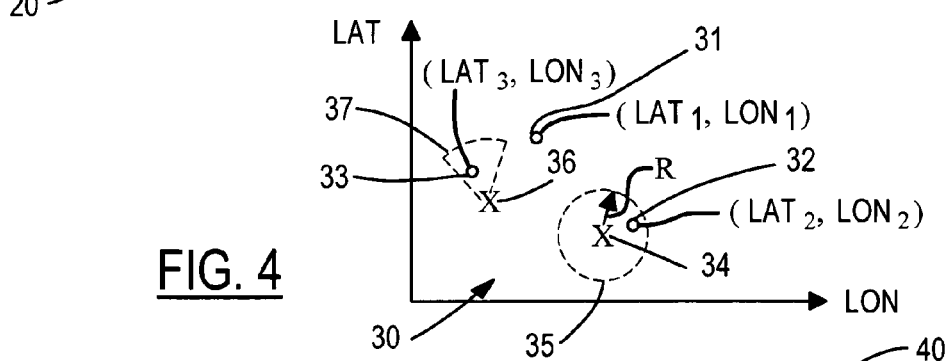
FIG. 4
FIG. 5

MOBILE SYSTEM REPRESENTING VIRTUAL OBJECTS ON LIVE CAMERA IMAGE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to wireless data services, and, more specifically, to enhancing a live camera scene on a mobile phone display by superimposing virtual objects for various purposes.

The multimedia and data capabilities of both wireless mobile devices (e.g., cell phones) and the service providers' telecommunications networks have been rapidly increasing. As the data handling and bandwidth capabilities of the networks have improved, the functionality available from the mobile devices has expanded to take advantage of the increased network capabilities.

One popular cell phone feature is an integrated camera for capturing still and/or video images. The captured scenes can be stored on the mobile device in an internal memory or using flash memory cards. In addition, many phones have the capability to remotely transmit the picture or video data to other cell phones or to a website or other network address, such as the Picture Mail$^{SM}$ multimedia messaging service available from Sprint® Nextel®.

GPS-enabled cell phones are now also widely available. Such a phone includes an integrated GPS receiver which provides latitude/longitude coordinates at high accuracy. The coordinates can be shared within the network in order to provide a location-based service. The present invention exploits these capabilities to create a new type of data service having novel functions never before realized.

SUMMARY OF THE INVENTION

The present invention allows objects (such as buildings, cars, landscaping, informative captions, icons or other graphics—some of which may be represented in a three dimensional markup language) to be superimposed on a live video feed being captured by a GPS-enabled mobile device. This provides architects, landscapers, designers, and others with an ability to present virtual models of their work on a live video image so that they or prospective clients can walk around and view the work "in situ", as it would appear when completed, by viewing them with a GPS-enabled camera phone.

In one aspect of the invention, a system for providing a mobile data service comprises a mobile device having a camera for capturing a live scene, a GPS receiver for determining geographic coordinates of the mobile device, and a display for displaying the live scene. A wireless network exchanges data signals with the mobile device. A server of the invention stores a database of virtual objects defined within a geographic space. The server receives the geographic coordinates of the mobile device. The server identifies one or more virtual objects within a field of view in the geographic space determined in response to the geographic coordinates of the mobile device. The server transmits representation image data to the mobile device corresponding to the one or more virtual objects as would be seen according to the field of view. The mobile device generates a representation on the display in response to the representation image data.

BRIEF DESCRIPTION OF THE DRAWINGS

FIG. 1 is a block diagram showing a network architecture of the invention.

FIG. 3 illustrates real and virtual objects at a particular site, and alternative fields of view that can be supported by the invention.

FIG. 4 is a plot of a geographic space having virtual objects associated with it.

FIG. 5 shows a sample database of virtual objects.

DETAILED DESCRIPTION OF PREFERRED EMBODIMENTS

Figure 2:
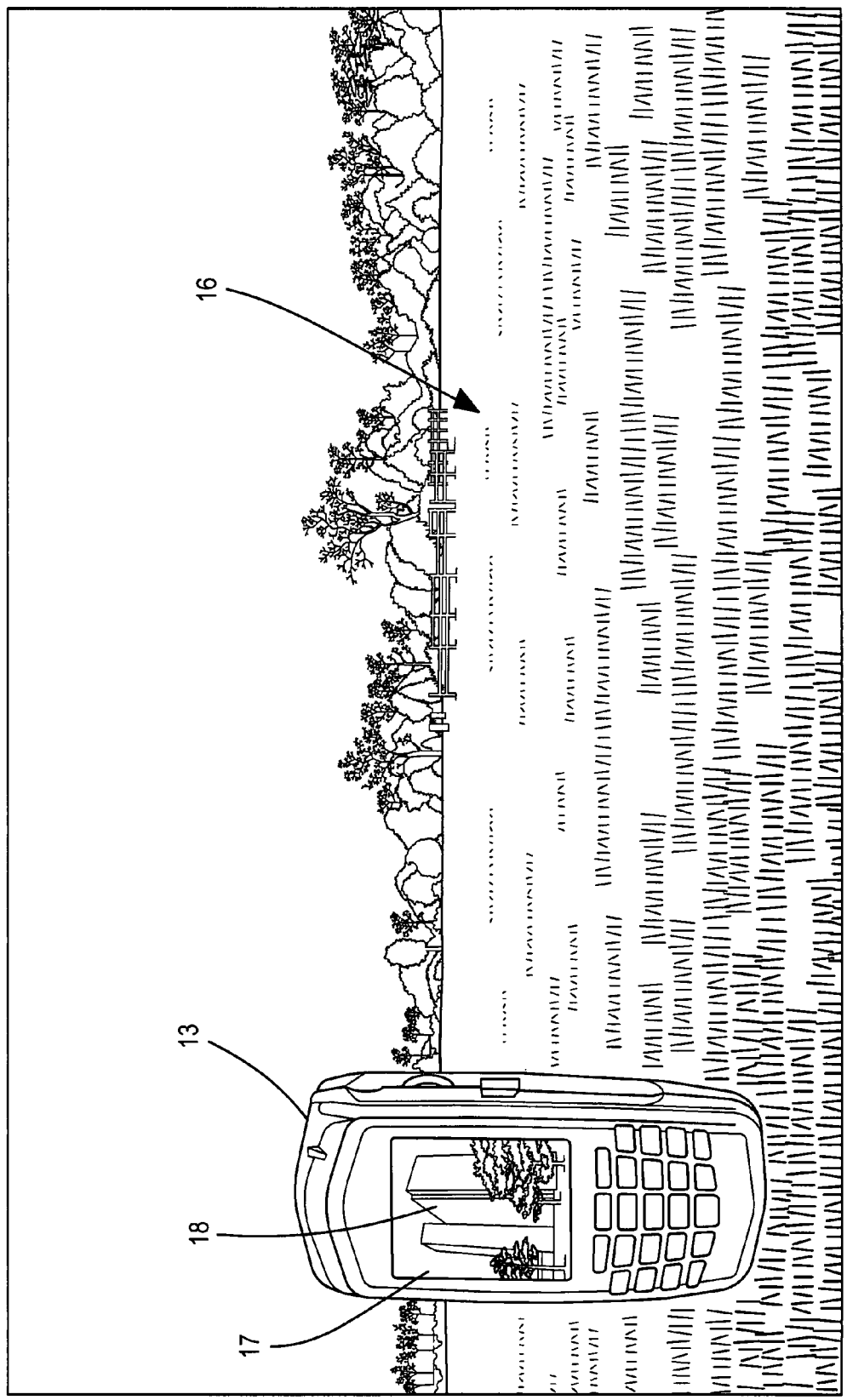
FIG. 2 illustrates a camera phone capturing a live scene and superimposing a virtual building onto the live scene.

The invention uses increased processing, graphics, and image capture capabilities of a GPS-enabled mobile device (such as a 3G or 4G smartphone) to display virtual objects superimposed as images on a live camera feed using the mobile device display. The mobile device may, for example, send both information about its GPS position and live images captured through its camera to a central application server in order to identify the "field of view" for the mobile device. This information is used to query a database of virtual objects on the application server to identify any objects which should be rendered on the mobile display based on authorization or subscription criteria, or any other desired determining criteria. Depending upon the computational capabilities of the mobile device, three-dimensional markup data may be transmitted back to the mobile device along with additional points of reference to render new objects when the field of view is changed. The mobile device evaluates the data it receives and renders the pertinent virtual objects on the display in their appropriate locations based on the current field of view. For a mobile device with less computational capability, the actual rendered image may be generated at the application server for transmitting to the mobile device. These and other embodiments will be described in greater detail in connection with the various Figures as follows.

Referring now to FIG. 1, a system 10 for providing a mobile data service includes a telecommunication network 11 having a cellular base station 12 in wireless communication with a mobile device 13. Mobile device 13 receives GPS signals from a plurality of GPS satellites 14. Mobile device 13 also interacts with an application server 15 via network 11. Server 15 contains a database of virtual objects for superimposing on live video images on mobile device 13 as will be described in greater detail below.

FIG. 2 illustrates a first example of the invention which allows an architect to create a virtual representation of a proposed building which could be previewed at the desired location in real time without requiring any special equipment for the user other than their standard mobile device. A proposed building site 16 may comprise undeveloped land as shown in FIG. 2. Mobile device 13 includes a display 17 responsive to an integrated camera (not shown) having a lens on the opposite side of device 13 for capturing a live scene of the site. Virtual objects 18 in the form of proposed buildings to be constructed at the site are superimposed on display 17. This allows the architect and their clients to have a more interactive experience when reviewing the design and visualizing the final result at the site. As mobile device 13 moves through the environment surrounding the proposed building, the final project can be displayed from any angle, thereby facilitating review of the building design for suitability and acceptance.

A preferred embodiment of the invention operates based on localization of a user's mobile device and the identification of a desired field of view as shown in FIG. 3. Thus, a localized area 20 within an overall coverage area of the mobile service may, for example, include an existing building 21 and an existing street 22. A proposed building 23 has a predefined fixed location, as does a proposed street extension 24. The data service can be invoked by a user when at a position 25 having corresponding geographic coordinates at the site. A field of view 26 has a predetermined angular size and direction extending away from position 25. Field of view 26 may, for example, correspond to the image field from the integrated camera and is directed toward the proposed location for building 23 from position 25. As used herein, "field of view" can also mean an image size other than that captured by the integrated camera. Thus, at a position 27, a field of view 28 may include a full 360° field of view. In other words, the field of view in the present invention can encompass more than just the instantaneous view of the camera, and the virtual object representations transmitted to the mobile device may cover more image area than is actually displayed on the mobile device at any one time.

FIG. 4 shows a geographic space 30 within which the virtual objects are defined. Thus, a first virtual object 31 is located at a position in terms of latitude and longitude of $(LAT_1, LON_1)$. Likewise, a virtual object 32 is located at $(LAT_2, LON_2)$ and a virtual object 33 is located at $(LAT_3, LON_3)$. When the data service is accessed, the corresponding location of the user's mobile device is mapped to the geographic space 30 and virtual objects within a predetermined radius are found. Thus, the GPS receiver in the mobile device may define a position 34 which maps to geographic space 30 as shown. A predetermined radius R centered on position 34 defines a region 35 which contains virtual object 32. Circular region 35 which corresponds to a full 360° field of view is especially well adapted to embodiments of the present invention wherein all virtual objects within seeing distance of the user are transmitted to the mobile device for rendering at the device in response to manipulation of the view by the user. However, in other embodiments, it may desirable to only transmit to the mobile device the data pertaining to virtual objects within a narrower field of view (e.g., the instantaneous camera scene). Thus, a position 36 in geographic space 30 has an associated field of view 37 which comprises a section of a circle. Virtual object 33 is contained within field of view 37, so that virtual object 33 would be rendered and displayed on the mobile device when accessing the data service from position 36 and field of view 37.

FIG. 5 shows a portion of one example of a database 40 for defining various virtual objects available within a particular data service. Each row represents a distinct record in the database stored according to the geographic location coordinates in latitude and longitude where each virtual object is to be represented. A first record 41 corresponding to coordinates $(LAT_1, LON_1)$ contains a 3D object definition which may preferably be comprised of a three-dimensional model allowing appropriate views to be constructed depending upon the perspective from which the object is seen. A record 42 includes a virtual object in the form of stylized text together with a definition of placement for the text in respective scenes. In a record 43, the virtual object comprises a two dimensional icon with rules for placement in respective scenes. A record 44 includes a virtual object comprised of navigation information such as directional arrows and/or text that may be placed within a scene to facilitate travel by a user to a particular destination. Each record may also contain other information for controlling access to particular users or for varying the properties of particular virtual objects in response to variables such as time of day or environmental factors, for example.

Figure 6:
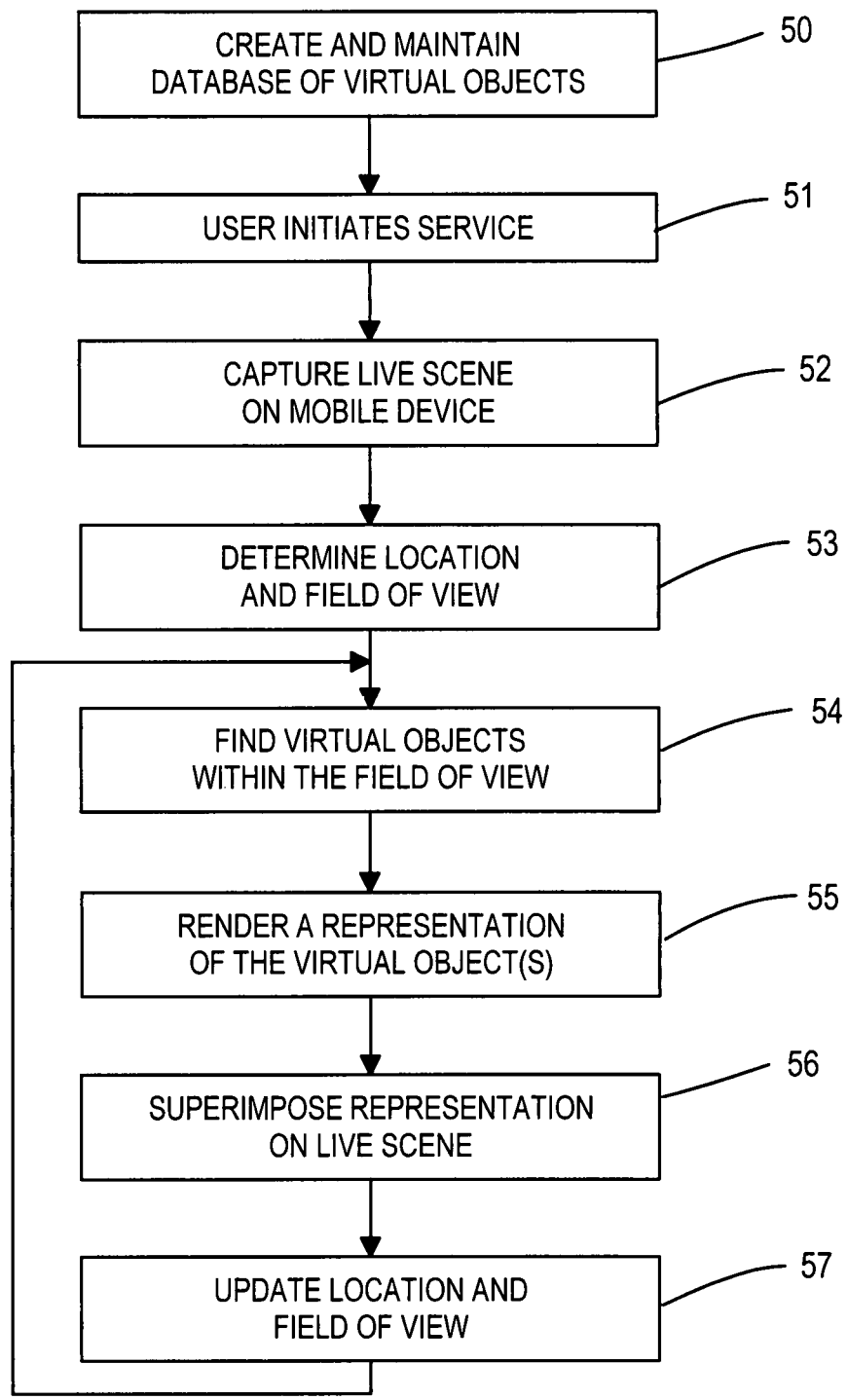
FIG. 6 is a flowchart of one preferred embodiment of the invention.

One preferred embodiment of a method for providing the mobile data service on the present invention is shown in FIG. 6. A database of virtual objects is created and maintained in step 50. Virtual objects may be entered into the database by a network provider or by subscribers according to access rights granted by the network provider according to a purchased subscription level, for example. The service provider may access the database directly on the server while subscribers may be given remote login capabilities via the interne, for example. Appropriate software defines the data formats used to represent the virtual objects whether as three dimensional models or other graphic or textual representations.

In step 51, a user initiates use of the data service to enhance a live scene. The live scene is captured on the mobile device in step 52. The location of the mobile device and the field of view to be examined for virtual objects are determined in step 53. The field of view determination can be made either by the mobile device or by the central application server, as desired. Moreover, the field of view can be determined directly from the captured live scene, by manual input by the user, or according to predefined rules specified for the data service.

Virtual objects within the field of view are found in step 54. In step 55, a representation of the virtual objects is rendered. The representation of the virtual objects is superimposed on the live scene in step 56. Thereafter, the location and field of view are updated in step 57 whenever the user moves around at a site in order to conduct a virtual examination of the virtual object from different positions. A return is made to step 54 based on the newly found location and field of view. In an alternative embodiment, a representation with greater field of view coverage may be transmitted to the mobile device which is updated according to minor position changes without requiring a new search for virtual objects, i.e. the field of view includes more than just the camera's field of view at any one time.

In the foregoing method, the server transmits representation image data to the mobile device corresponding to the one or more virtual objects as would be seen according to the field of view. Representation image data as used herein refers to data either before or after actual rendering into a displayable image element. The term "representation" refers to the actual image element superimposed on the live scene.

Figure 7:
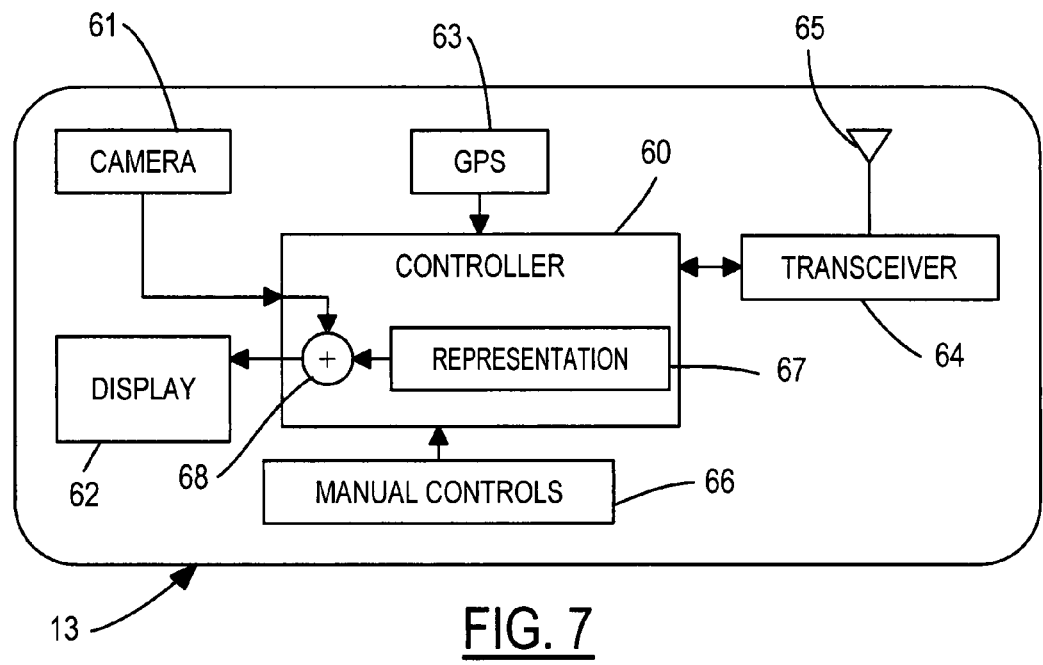
FIG. 7 is a block diagram showing relevant elements within a mobile device adapted to practice the present invention.

Mobile device 13 is shown in greater detail in FIG. 7. A controller 60 is a programmable general purpose microcontroller adapted for mobile wireless applications. It is connected to a camera 61 for receiving a live scene and to a display 62 for reproducing the live scene. A GPS receiver 63 integral with mobile device 13 is connected to controller 60 to provide instantaneous geographic coordinates in the conventional manner Controller 60 is coupled to a transceiver 64 which is connected to a cellular antenna 65 for sending and receiving wireless cellular transmissions. Mobile device 13 further includes manual controls 66 which may be comprised of push buttons, a touch screen, or may even comprise a microphone and voice recognition function within controller 60.

Controller 60 is programmed to generate a representation 67 which is based on a virtual object as previously described. The rendering (i.e., the process of obtaining actual onscreen image elements from the initial definition or model of the virtual object) may be performed 1) at the server, or 2) by controller 60 in response to representation image data obtained via transceiver 64 from the application server. When contained in controller 60, the "renderer" may comprise appropriate software that operates is a conventional manner. Representation 67 is provided to one input of an image combiner 68. Combiner 68 receives the live scene from camera 61 at a second input. The output of image combiner 68 is provided to display 62 so that a building or other virtual object is correctly located in the live scene and shown on display 62.

Figure 8:
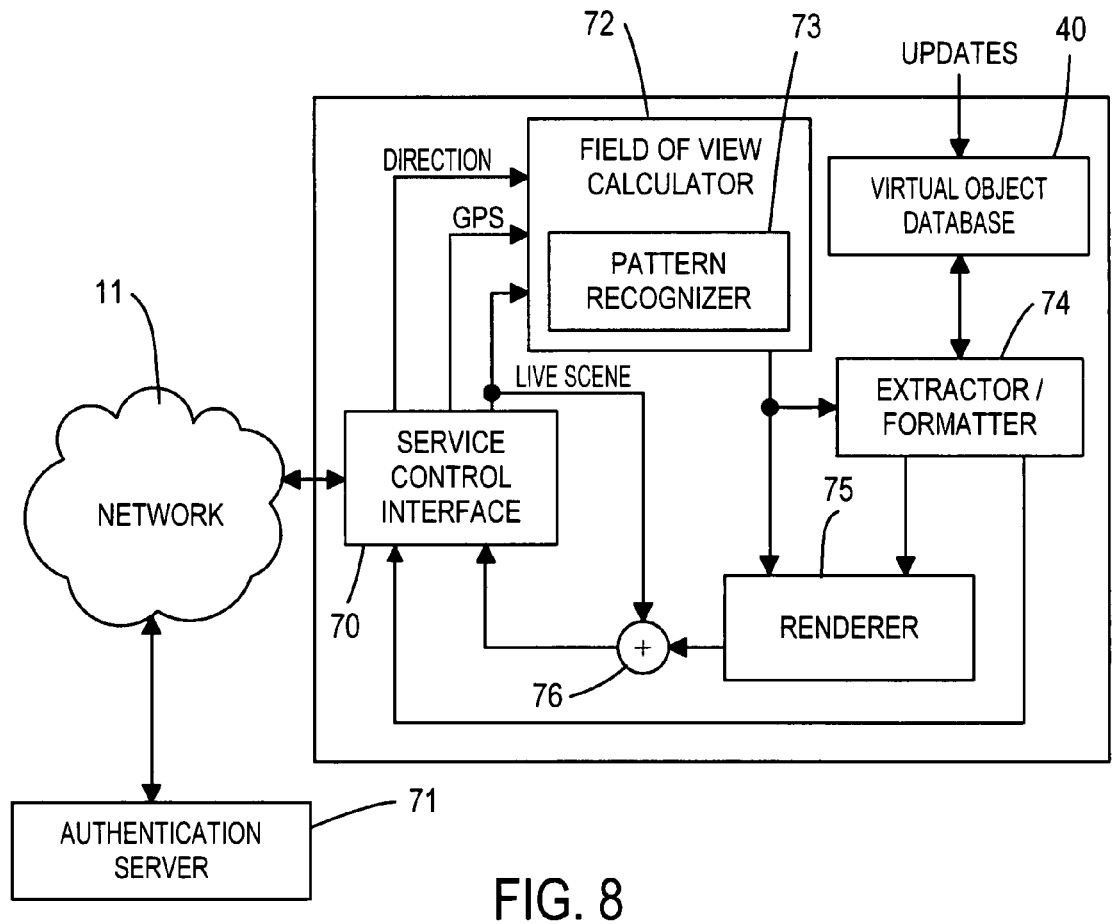
FIG. 8 is a block diagram showing a server architecture of the invention.

Application server 15 is shown in greater detail in FIG. 8. A service control interface 70 is coupled to network 11 for exchanging data signals with the mobile device and with an authentication server 71. Authentication server 71 is optional, but is preferably utilized in an implementation of the data service wherein subscribers access the service based on being registered as a paying user.

Server 15 includes a field of view calculator 72 coupled to service control interface 70 for receiving data from the mobile device representing the live scene and the GPS coordinates of mobile device. Field of view calculator 72 may also receive a direction signal which may be generated by user manipulation of the manual controls on the mobile device when it is desired to allow the user to interactively decide on a desired field of view, for example. Thus, a location may be defined by GPS coordinates and the user may then manipulate the manual controls to indicate a field of view directed to the north or some other particular direction. Alternatively, the direction associated with the desired field of view may be obtained using a pattern recognizer 73 within field of view calculator 72 which recognizes the direction by comparing the live scene to previously stored image data within the database of virtual objects so that the direction implicit in the live scene can be determined. The calculated field of view is provided to an extractor/formatter 74 which is coupled to virtual object database 40 for identifying the virtual objects of interest based on the field of view. Virtual object definitions extracted by extractor/formatter 74 may be formatted for immediate rendering by a renderer 75, or may be formatted for transmission to the mobile device via a direct connection to service control interface 70. Renderer 75 also receives the calculated field of view so that the appropriate virtual object representation can be output to an image combiner 76 which also receives the live scene. The combined images are provided to service control interface 70 for transmission to the mobile device over network 11. Alternatively, the virtual object representation from renderer 75 may bypass combiner 76 to be combined with the live scene by the mobile device (not shown).

According to another alternative embodiment, the 3D markup language (e.g., a 3D model and associated metadata) stored in the virtual object database is transmitted directly to a mobile device having a controller with sufficient computing power that it can run software that identifies the field of view and renders the virtual object for display. Thus, the processing load for the application server can be reduced when it is possible to push the processing function to the handset. In particular, one preferred embodiment of the corresponding operation proceeds as follows. When the mobile device enters a location, it is alerted to the availability of virtual object content. The mobile device can also explicitly query for the availability of content at the location. When content is available, it is transmitted to the device with a "reference point map" allowing the device to identify the desired (x,y,z) rendering locations on the live image capture. The device then renders and overlays the virtual object(s) on the live image in real time. Two benefits of this embodiment are that 1) for the user, the display of virtual objects happens more quickly and is more responsive to small changes in the live image, and 2) for the wireless operator, less data needs to be streamed over the network which results in less impact on network capacity and reduced need for infrastructure at the data center.

Figure 9:
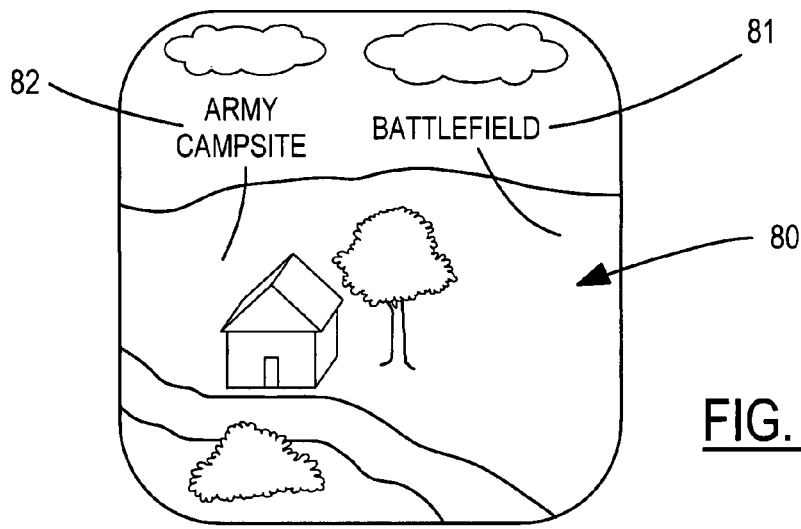
FIGS. 9-11 are sample displays corresponding to various types of virtual objects for enhancing a live scene.

The system for superimposing virtual objects on a live scene as disclosed herein has many useful applications. By way of example, educators or tourist attraction operators can utilize the invention to deliver additional information or historical representations at important sites to mobile device users. Thus, while at a particular attraction, the data service is used to point out places of interest to the user while examining the site. By joining the additional information or representations to a live scene of the attraction, the impact and realism of the presentation to the user is increased. FIG. 9 shows one example wherein a live scene 80 is captured at a site of a historic battle. A stylized text 81 for identifying the actual place of the battlefield within the live scene is shown with an associated lead line placed according to the placement information contained in the virtual object definition for the stylized text. Likewise, a virtual object 82 comprises text and a lead line for identifying an army campsite within the live scene.

Figure 10:
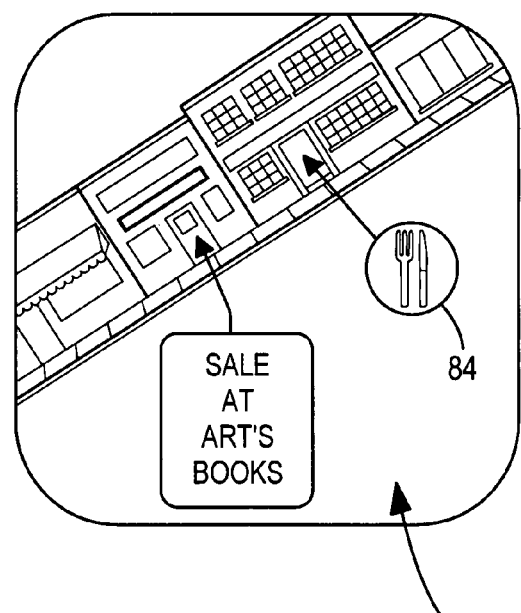

In another application of the invention, companies or individuals may promote their businesses at specific locations by setting up virtual objects associated with specific business establishments that may be displayed in real time on a mobile device by the wireless subscriber. Thus, as shown in FIG. 10, a live scene 83 depicts a shopping district where the subscriber takes a picture to capture the live scene and virtual objects are then added to the live scene for identifying relevant information for businesses subscribing to the data service. For example, a stylized text display may be generated for identifying a sale taking place at a particular establishment. Alternatively, an icon such as a restaurant symbol 84 may be presented to identify the type of establishment.

Figure 11:
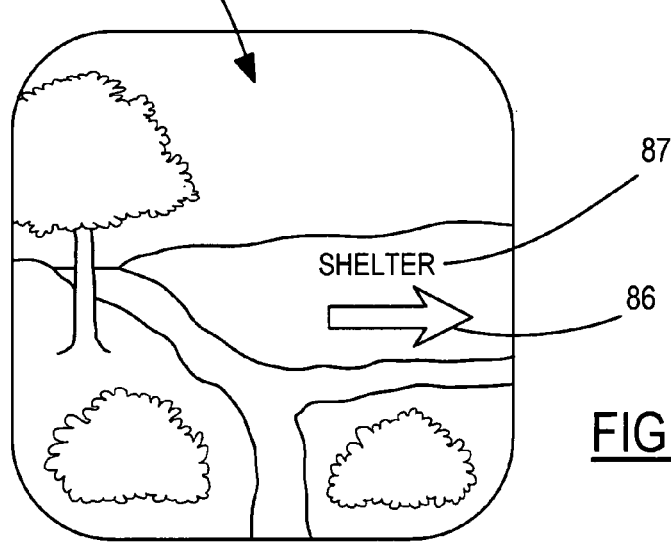

In another application of the data system, virtual objects may be presented to assist a user by providing navigational information associated with their surroundings. FIG. 11 shows a live scene 85 captured in a park containing various nature trails. Using the captured scene, the application server determines relative direction to one or more landmarks and appropriately provides a virtual object representation such as directional arrow 86 and legend 87 for showing the way to a nearby shelter. Those skilled in the art will easily recognize many other potential applications for the data service as described herein.

What is claimed is:

1. A system for providing a mobile data service comprising:
    a mobile device having a camera for capturing a live scene, a GPS receiver for determining geographic coordinates of the mobile device, and a display for displaying the live scene;
    a wireless network for exchanging data signals with the mobile device; and
    a server having a database of virtual objects defined within a geographic space, wherein the server receives the geographic coordinates of the mobile device, wherein the server identifies one or more virtual objects within a field of view in the geographic space determined in response to the geographic coordinates of the mobile device, and wherein the server transmits representation image data to the mobile device corresponding to the one or more virtual objects as would be seen according to the field of view;

wherein the mobile device generates a representation on the display in response to the representation image data.

2. The system of claim 1 wherein the representation generated on the display is superimposed over the live scene.

3. The system of claim 2 wherein the representation comprises a graphic element selected from the group comprising a three dimensional object to be visualized at the geographic coordinates and directional information for navigating through the live scene.

4. The system of claim 1 wherein the mobile device further comprises a user control for inputting field of view data, and wherein the field of view data is transmitted to the server for use in identifying the one or more virtual objects.

5. The system of claim 1 wherein the mobile device further comprises a user control for manipulating the representation and the live scene as generated on the display.

6. The system of claim 1 wherein the live scene is transmitted to the server, and wherein the server includes a pattern recognizer for identifying the field of view.

7. The system of claim 1 wherein the server includes a renderer for rendering the representation from the representation image data prior to transmission to the mobile device.

8. The system of claim 1 wherein the mobile device includes a renderer for rendering the representation from the representation image data after reception from the server.

9. The system of claim 1 wherein the representation image data transmitted to the mobile device includes a three-dimensional model, and wherein the mobile device includes a controller for identifying the field of view and rendering the representation in response to the three-dimensional model.

10. A method of providing a mobile data service to a mobile device in communication with a wireless network, wherein the mobile device has a camera for capturing a live scene and a display for displaying the live scene, the method comprising the steps of:

maintaining a database of virtual objects defined within a geographic space correlated to actual geographic coordinates where the mobile device is used, wherein the database of virtual objects is stored in a server coupled to the wireless network;

capturing the live scene using the camera on the mobile device;

identifying a field of view within the geographic space corresponding to the live scene;

identifying one or more virtual objects within the field of view;

rendering a representation of the one or more virtual objects according to the field of view; and superimposing the representation over the live scene on the display.

11. The method of claim 10 wherein the step of identifying a field of view includes determining the geographic coordinates of the mobile device.

12. The method of claim 10 wherein the virtual objects are comprised of three dimensional objects to be visualized at respective geographic coordinates.

13. The method of claim 10 wherein the virtual objects are comprised of textual information pertaining to locations at respective geographic coordinates.

14. The method of claim 10 wherein the virtual objects are comprised of icons conveying information pertaining to locations at respective geographic coordinates.

15. The method of claim 10 wherein the virtual objects are comprised of directional information for navigating through the live scene.

16. An application server adapted to provide a mobile data service to a mobile device in communication with a wireless network, wherein the mobile device has a camera for capturing a live scene and a display for displaying the live scene, the application server comprising:

a database of virtual objects defined within a geographic space correlated to actual geographic coordinates where the mobile device is used;

a network interface to receive geographic coordinates of the mobile device;

a field of view calculator for determining a field of view in response to the geographic coordinates; and an extractor for identifying one or more virtual objects within the field of view;

wherein the network interface transmits representation image data to the mobile device corresponding to the one or more virtual objects.

17. The application server of claim 16 wherein the network interface receives a live scene from the mobile device, and wherein the application server further comprises a pattern recognizer for identifying the field of view.

18. The application server of claim 16 further comprising a renderer for generating a rendered representation for transmission to the mobile device as the representation image data via the network interface to be superimposed on the live scene displayed by the mobile device.

19. The application server of claim 16 further comprising a renderer for generating a rendered representation and an image combiner for superimposing the rendered representation onto the live scene, wherein the combined representation and live scene is transmitted to the mobile device.

20. The application server of claim 16 wherein the representation image data transmitted by the server to the mobile device comprises unrendered data for rendering by the mobile device.

* * * * *